United States Patent [19]

Peters

[11] 4,358,361
[45] Nov. 9, 1982

[54] DEMETALATION AND DESULFURIZATION OF OIL

[75] Inventor: Alan W. Peters, Moorestown, N.J.

[73] Assignee: Mobil Oil Corporation, New York, N.Y.

[21] Appl. No.: 286,433

[22] Filed: Jul. 24, 1981

Related U.S. Application Data

[63] Continuation of Ser. No. 83,021, Oct. 9, 1979, abandoned.

[51] Int. Cl.$^3$ .................. C10G 45/08; C10G 65/12
[52] U.S. Cl. ............................ 208/89; 208/216 PP; 208/251 H; 252/458; 252/477 R
[58] Field of Search ............... 208/89, 216, 251 R, 208/251 H

[56] References Cited

U.S. PATENT DOCUMENTS

| | | | |
|---|---|---|---|
| 3,775,294 | 11/1973 | Peterson et al. | 208/88 X |
| 3,843,341 | 10/1974 | Hammel et al. | 252/460 X |
| 3,876,523 | 4/1975 | Rosinski et al. | 208/89 |
| 3,923,688 | 12/1975 | Hammel et al. | 252/432 |
| 3,947,347 | 3/1976 | Mitchell | 208/251 H |
| 3,983,030 | 9/1976 | Rosynek et al. | 208/253 |
| 4,327,236 | 4/1982 | Klotz | 208/110 X |

FOREIGN PATENT DOCUMENTS 82680 6/1971 German Democratic Rep. .................. 208/114

*Primary Examiner*—Delbert E. Gantz
*Assistant Examiner*—G. E. Schmitkons
*Attorney, Agent, or Firm*—Charles A. Huggett; Michael G. Gilman; Charles J. Speciale

[57] ABSTRACT

This invention is concerned with removing metals and sulfur from oil, preferably from residual oil, by contact with a novel catalyst. Said catalyst comprises a Group VIII metal and a Group VI metal deposited within an amorphous porous glass support of controlled pore size distribution.

39 Claims, No Drawings

DEMETALATION AND DESULFURIZATION OF OIL

This is a continuation of application Ser. No. 83,021 filed Oct. 9, 1979 now abandoned.

BACKGROUND OF THE INVENTION

1. Field of the Invention

This invention is concerned with the demetalation and desulfurization of oil. More particularly, this invention relates to the use of a regenerable catalyst of controlled pore size distribution for demetalation and desulfurization of oil.

2. Description of the Prior Art

Residual petroleum oil fractions produced by atmospheric or vacuum distillation of crude petroleum are characterized by relatively high metals and sulfur content. This comes about because practically all of the metals present in the original crude remain in the residual fraction, and a disproportionate amount of sulfur in the original crude oil also remains in that fraction. Principal metal contaminants are nickel and vanadium, with iron and small amounts of copper also sometimes present. Additionally, trace amounts of zinc and sodium are found in some feedstocks. The high metals content of the residual fractions generally precludes their effective use as charge stocks for subsequent catalytic processing such as catalytic cracking and hydrocracking. This is so because the metal contaminants deposit on the special catalysts for these processes and cause the premature aging of the catalyst and/or formation of inordinate amounts of coke, dry gas and hydrogen.

It is current practice to upgrade certain residual fractions by a pyrolitic operation known as coking. In this operation, the residuum is destructively distilled to produce distillates of low metals content and leave behind a solid coke fraction that contains most of the metals. Coking is typically carried out in a reactor or drum operated at about 800° to 1100° F. temperature and a pressure of 1 to 10 atmospheres. The economic value of the coke by-product is determined by its quality, especially its sulfur and metals content. Excessively high levels of these contaminants make the coke useful only as low-valued fuel. In contrast, cokes of low metals content, for example up to about 100 p.p.m. (parts per million) by weight of nickel and vanadium, and containing less than about 2 weight percent sulfur, may be used in high-valued metallurgical, electrical and mechanical applications.

Certain residual fractions are currently subjected to visbreaking, which is a heat treatment of milder conditions than used in coking, in order to reduce their viscosity and make them more suitable as fuels. Again, excessive sulfur content sometimes limits the value of the product.

Residual fractions are sometimes used directly as fuels. For this use, a high sulfur content in many cases is unacceptable for ecological reasons.

At present, catalytic cracking generally utilizes hydrocarbon charge stocks lighter than residual fractions, which generally have an API gravity less than 20. Typical cracking charge stocks are coker and/or crude unit gas oils, vacuum tower overhead, etc., the feedstock having an API gravity from about 15 to about 45. Since these cracking charge stocks are distillates, they do not contain significant proportions of the large molecules in which the metals are concentrated. Such cracking is commonly carried out in a reactor operated at a temperature of about 800° to 1500° F., a pressure of about 1 to 5 atmospheres absolute, and a space velocity of about 1 to 1000 WHSV.

The amount of metals present in a given hydrocarbon stream is often expressed as a charge stock's "metals factor". This factor ($F_m$) is equal to the sum of the metals concentrations, in parts per million, of iron and vanadium plus ten times the concentration of nickel and copper in parts per million, and is expressed in equation form as follows:

$$F_m = Fe + V + 10(Ni + Cu)$$

Conventionally, a charge stock having a metals factor of 2.5 or less is considered particularly suitable for catalytic cracking. Nonetheless, streams with a metals factor of 2.5 to 25, or even 2.5 to 50, may be used to blend with or as all of the feedstock to a catalytic cracker, since charge stocks with metals factors greater than 2.5 in some circumstances may be used to advantage, for instance with the newer fluid cracking techniques.

In any case, the residual fractions of typical crudes will require treatment to reduce the metals factor. As an example, a typical Kuwait crude, considered of average metals content, has a metals factor of about 75 to about 100. As almost all of the metals are combined with the residual fraction of a crude stock, it is clear that at least about 80% of the metals and preferably at least 90% must be removed to produce fractions (having a metals factor of about 2.5 to 50) suitable for cracking charge stocks.

Metals and sulfur contaminants would present similar problems with regard to hydrocracking operations which are typically carried out on charge stocks even lighter than those charged to a cracking unit. Typical hydrocracking reactor conditions consist of a temperature of 400° to 1000° F. and a pressure of 100 to 3500 p.s.i.g.

It is evident that there is considerable need for an efficient method to reduce the metals and/or sulfur content of petroleum oils, and particularly of residual fractions of these oils. While the technology to accomplish this for distillate fractions has been advanced considerably, attempts to apply this technology to residual fractions generally fail due to very rapid deactivation of the catalyst, presumably by metal contaminants.

By the 1960's, there was universal recognition in the art that hydrogenation catalysts comprising Group VI and Group VIII metals of their oxides or sulfides deposited on porous refractory supports were extremely useful in the demetalation and desulfurization of residue hydrocarbon fractions. Particularly preferred catalysts were considered to be cobalt-molybdate or nickel-cobalt-molybdate supported on alumina. These catalysts are generally referred to as "conventional HDT catalysts" or "conventional hydrotreating catalysts".

The pore size distribution of the catalyst utilized for demetalation and/or desulfurization is a very important parameter. Large pore catalysts generally possess greater demetalation activity than smaller pore catalysts; small pore catalysts generally possess higher desulfurization activity than large pore catalysts. Processes utilizing pore size distribution can be considered to fall into one of the following categories: (1) the use of a single catalyst pore size distribution for demetalation; (2) the use of a single catalyst pore size distribution for desulfurization; (3) the use of a single catalyst pore size distribution for both demetalation and desulfurization; and (4) the use of two or more catalysts with different pore size distributions, where one or more catalysts are generally for demetalation and other catalysts are generally for desulfurization.

U.S. Pat. Nos. 3,393,148; 3,674,680; 3,764,565; 3,841,995 and 3,882,049 disclose desulfurization processes using an average pore diameter size for conventional HDT catalysts of 100 to 200 Angstroms.

There are many processes geared to the hydrodesulfurization of residual oil fractions utilizing conventional HDT catalysts characterized by a specific pore size distribution. Examples of such processes are described in U.S. Pat. Nos. 3,730,879; 3,814,683; 3,902,991; 4,032,435; 4,051,021; 4,069,139 and 4,073,718.

Processes for the demetalation and desulfurization of residual oil fractions employing conventional HDT catalysts characterized by having at least 60% of their pore volume in pores having diameters of 100 to 200 Angstroms and at least 5% of their pore volume in pores having diameters greater than 500 Angstroms are disclosed in U.S. Pat. Nos. 3,876,523 and 4,016,067. U.S. Pat. Nos. 3,891,541 and 3,931,052 disclose the demetalation and desulfurization of petroleum oils through the use of a conventional HDT catalyst whose pores are substantially distributed over a narrow 180 to 300 Angstrom diameter range.

Metals and sulfur contaminants are removed from residual oil fractions by catalytic contact with a series of catalysts in U.S. Pat. Nos. 4,016,067 and 4,054,508. In the processes of these patents, advantage is taken of different pore size distributions for the separate functions of demetalation and desulfurization.

U.S. Pat. Nos. 3,716,479 and 3,772,185 propose demetalation of a charge stock by contact with added hydrogen in the presence of a catalyst material derived from a manganese nodule.

Demetalation of hydrocarbon fractions is taught in U.S. Pat. No. 2,902,429 as contacting said fractions with a catalyst having a relatively small amount of sulfur-resistant hydrogenation-dehydrogenation component disposed on a low surface area carrier. Examples of such low surface area carriers include diatomaceous earth, natural clays and Alundum.

U.S. Pat. No. 3,867,282 describes a process for oil demetalation and desulfurization using a catalyst comprising a cobalt-molybdenum impregnated magnesium aluminate spinel.

Regeneration of catalysts used in residual oil hydroprocessing has been generally limited to hydrodesulfurization catalysts, as is illustrated by U.S. Pat. No. 3,565,820. Conventional hydrotreating catalysts can tolerate only 6 to 7% metals (Ni and V) and are not regenerable, thus it would be very desirable to have an effective regenerable catalyst for demetalation.

Regeneration of catalysts is preferred over the use of throw-away catalysts. Throw-away catalysts present disposal problems as well as relatively low activity. Also the use of regenerable catalysts would tend to be less expensive in the long run than throw-away catalysts. The use of metal tolerant, regenerable catalysts will not only decrease process costs, but more importantly will enhance the economic feasibility of treating high metal resids and heavy oils.

It is generally known in the art that leaching alkali silicate glasses with acids results in porous absorbents which are reported to exhibit molecular sieve-type absorption toward small molecules. In general, the glasses consist of three components: an alkali such as sodium or potassium, another oxide such as $B_2O_3$ or $Al_2O_3$, and silica. Porous glass with uniform pore sizes of 3 to 10 Angstroms has been reported. The porosity of said glasses is produced by acid leaching and the pore size distribution is controlled by the degree of acid leaching.

A novel catalyst composition comprising the oxides or sulfides of a Group VI metal and a Group VIII metal deposited within a porous glass support of controlled pore size is disclosed in U.S. Patent application Ser. No. 083,022 (filed Oct. 9, 1979) now abandoned for Ser. No. 250,808 (filed Apr. 3, 1981). The process of the instant invention employs this novel catalyst in processes for the catalytic demetalation and desulfurization of oil.

An objective of this invention is to provide means for the removal of metal and sulfur contaminants from oils. A further objective of this invention is to provide means for removal of metal and sulfur contaminants from residual hydrocarbon fractions. Another objective of this invention is to provide a method whereby hydrocarbon fractions having a significant metal and sulfur content may be demetalized and desulfurized in order to produce a suitable charge stock for cracking, hydrocracking or coking.

SUMMARY OF THE INVENTION

Effective removal of harmful nickel and vanadium metals, as well as sulfur, from petroleum residua can be accomplished by contact, under appropriate conditions, with a novel catalyst. Said catalyst comprises a Group VIII metal (e.g. Fe, Co, Ni) and a Group VI metal (i.e. Cr, Mo, W) on an amorphous porous glass support of controlled pore size distribution. This catalyst is thermally stable, almost completely regenerable and can be made in almost any desirable pore size range, including almost uniform pore sizes for maximum activity.

DESCRIPTION OF THE PREFERRED EMBODIMENTS

The hydrocarbon feed to the processes of this invention can be a whole crude. However, since the high metal and sulfur components of a crude oil tend to be concentrated in the higher boiling fractions, the present processes more commonly will be applied to a bottoms fraction of a petroleum oil, i.e. one which is obtained by atmospheric distillation of a crude petroleum oil to remove lower boiling materials such as naphtha and furnace oil, or by vacuum distillation of an atmospheric residue to remove gas oil. Typical residues to which the present invention is applicable will normally be substantially composed of residual hydrocarbons boiling above 650° F. and containing a substantial quantity of asphaltic materials. Thus, the charge stock can be one having an initial or 5% boiling point somewhat below 650° F., provided that a substantial proportion, for example about 70 or 80% by volume, of its hydrocarbon components boil above 650° F. A hydrocarbon stock having a 50% boiling point of about 900° F. and which contains asphaltic materials, 4% by weight sulfur and 51 p.p.m. nickel and vanadium is illustrative of such charge stock. Chargestocks involving liquids derived from carbonaceous sources such as coal, or sands, shale oil, etc. can also be used as a feedstock for the instant invention. Typical process conditions may be defined as contacting metal and/or sulfur contaminant containing charge stock with the catalyst of this invention under a hydrogen pressure of about 500 to 3000 p.s.i.g., at 600° to 850° F. temperature, and a space velocity of about 0.1 to 5

LHSV (i.e. 0.1 to 5 volumes of charge stock per volume of catalyst per hour).

The demetalation function of the catalyst employed in this invention can be carried out either with or without the presence of added hydrogen. If hydrogen is added for the processes of demetalation and/or desulfurization, the hydrogen gas which is used during the process is circulated at a rate between about 1,000 to 15,000 s.c.f./bbl of feed and preferably between about 3,000 and 8,000 s.c.f./bbl. The hydrogen purity may vary from about 60 to 100%. If the hydrogen is recycled, which is customary, it is desirable to provide for bleeding-off a portion of the recycle gas and to add makeup hydrogen in order to maintain the hydrogen purity within the range specified. The recycled gas is usually washed with a chemical absorbent for hydrogen sulfide or otherwise treated in known manner to reduce the hydrogen sulfide content thereof prior to recycling.

The catalyst useful in this invention comprises a hydrogenation component composited within a porous glass support of controlled pore size distribution. The hydrogenation component can be any known material or combination thereof effective to demetalate and/or desulfurize the charge stock under the reaction conditions described herein. The preferred and commonly used hydrogenation component comprises the oxides or sulfides of a Group VIII metal and a Group VI metal. The Group VIII metals as generally used herein include iron, cobalt, and nickel, of which cobalt and nickel are particularly preferred; and the Group VI metals include chromium, molybdenum, and tungsten, of which molybdenum and tungsten are particularly preferred. Particularly preferred combinations include cobalt and molybdenum or nickel and molybdenum. The catalyst compositions contain the preferred combinations of metals, computed as oxide and based on total weight of catalyst, in amounts of about 2 wt.% to about 6 wt.% cobalt oxide (CoO) or nickel oxide (NiO) and from about 8 wt.% to about 20 wt.% molybdenum trioxide ($MoO_3$), the remainder being the glass support. Compositing the hydrogenation component with the glass support may be done by any of the impregnation techniques known in the art. A preferred impregnation technique is vacuum spraying.

The support for the novel catalyst of this invention is a glass that upon leaching becomes porous. One such glass is borosilicate type glass. Borosilicate glasses usually contain about 13 to 28% $B_2O_3$ and about 80 to 87% $SiO_2$. They also may contain alkali metal oxides such as sodium or potassium oxide. Borosilicates are characterized by low expansion coefficients, superior resistance to shock, excellent chemical stability and excellent resistance to heat. Borosilicates can withstand temperatures up to about 1000° F. Although borosilicates are usually amorphous, they can also be crystalline. The support for the novel catalyst of this invention, however, must be amorphous.

The glass support of the instant invention is characterized by the following composition:

|  | PREFERRED | MORE PREFERRED |
| --- | --- | --- |
| Alkali Metal Oxide | 2 to 10 wt. % | 4 to 8 wt. % |
| $B_2O_3$ | 15 to 35 wt. % | 20 to 30 wt. % |
| $SiO_2$ | 60 to 85 wt. % | 60 to 75 wt. % |

Alkali metal oxides comprise sodium oxide, potassium oxide and lithium oxide. Sodium oxide and potassium oxide are preferred in the present invention, with sodium oxide being particularly preferred.

The leaching procedure involved in the instant invention differs from conventional procedures such as the Vycor process. Whereas the object of leaching in the Vycor process is to remove $Na_2O$ and $B_2O_3$ to produce an almost pure vitreous silica, the leaching procedure used in the present invention is directed towards discriminating between liquid phases (i.e. a silica-rich phase and a silica-poor phase). The glass is leached in such a manner that it becomes porous. Such leaching is accomplished by successive contacts with acid, followed by contacting the glass with alkaline solution.

The catalyst of this invention has unique properties which make it quite superior to the prior art catalysts. The glass supported catalyst used in this invention is thermally stable, regenerable, and capable of being made in almost uniform pore sizes.

The catalyst useful in this invention is produced in controlled pore size distribution. Therefore, the catalyst particles are almost uniform in size. A typical catalyst with good selectivity for demetalation relative to desulfurization can be made with 90% or greater of its pore volume in pore diameters of at least 300 Angstroms size. A catalyst selective for desulfurization and demetalation can be made with smaller uniform size pore diameters, e.g. 50 Angstroms, 100 Angstroms, 200 Angstroms, etc.

The catalyst used in this invention would be particularly well suited to upgrade existing resid hydrotreating processes. Said processes typically operate at a liquid hourly space velocity of about 0.3 and have a cycle length of approximately 6 months. The exact liquid hourly space velocity and cycle length required depend on the total amount of metals deposited on the catalyst. Processes involving residual stocks having a high metals content are usually characterized by lower space velocities and/or shorter cycle length than corresponding processes utilizing residua of a lower metals content. The use of the regenerable catalyst of this invention in said processes would have the beneficial effects of extending cycle length and/or increasing space velocity by at least a factor of four. Also the use of the regenerable catalyst of this invention in said processes would result in many instances in reducing catalyst costs and imparting the capability of handling residua and heavy oils containing higher than usual metal concentrations.

One embodiment of this invention is to utilize this catalyst in a guard chamber upstream of units employing silica alumina base catalysts, e.g. cracking, hydrocracking or coking units. When using the catalyst of this invention in large uniform pore size, e.g. 300 Angstroms and greater, advantage can be taken of said catalyst's high selectivity for demetalation relative to desulfurization as compared to silica-alumina base catalysts. This would result in effective metals removal, thus enhancing the sulfur removal capabilities of said upstream units. Thus enhanced sulfur removal is brought about by the increased activity of the silica-alumina base catalyst of said upstream units which would no longer be subjected to extreme metal poisoning.

The catalyst employed in this invention also exhibits a high selectivity for vanadium removal over nickel removal. The presence of vanadium in a normal cracking operation hinders regeneration of the conventional alumina catalysts. Therefore, removal of vanadium will impart regenerability to the entire catalyst system.

Another embodiment of this invention takes advantage of the controlled pore size distribution of the catalysts used in this invention. A series of catalyst beds, each containing catalysts of different and almost uniform pore sizes, can be used wherein each bed performs a specific function. For example, a two bed system can be utilized as follows: one bed can employ catalysts of large uniform pore size generally for demetalation (e.g. 300 Angstrom size diameters and greater) and the following bed can use smaller uniform pore size catalysts generally for desulfurization (e.g. 50, 100, 150 or 200 Angstrom size diameters).

While not wishing to be bound by any particular theory of operability, it is believed that the regenerability of the catalyst utilized in this invention is due to the thermal stability of the catalyst's glass supports. The catalyst can be regenerated by any standard techniques such as washing or burning.

The following examples will serve to illustrate the invention without limiting same.

EXAMPLE 1

This example will serve to illustrate the preparation of a catalyst that can be used in this invention.

One hundred seventy grams sodium borosilicate frit (Corning Glass Co., composition: 6% $Na_2O$, 25.6% $B_2O_3$, 68.4% $SiO_2$; refractive index: 1.476±0.002) were heated at 650° C. for 16 hours. The glass was crushed and a 12-24 mesh portion separated for leaching, according to W. Haller, *REARRANGEMENT KINETICS OF THE LIQUID-LIQUID IMMISCIBLE MICROSPHERES IN ALKALI BOROSILICATE MELTS*, J. Chem. Phys. 42, 686 (1965), the entire contents of which are incorporated by reference herein. First leaching was done for 6 hours at 90° C. with 3N HCl (800 ml per 100 g. glass). This was followed by overnight leaching under the same conditions and finally alkaline leaching, 2 hours at room temperature with 0.5 N NaOH. The glass was vacuum impregnated with ammonium molybdate and cobalt nitrate solutions to give 4% cobalt and 10% molybdena.

The pore size distribution of the aforementioned catalyst as ascertained by a mercury porosimeter was determined to be as follows:

| Pore Diameter, Angstroms | Pore Volume, cc/gm | % Pore Volume |
| --- | --- | --- |
| 30-50 | 0.009 | 3.7 |
| 50-80 | 0.007 | 2.9 |
| 100-150 | 0.002 | 0.8 |
| 150-200 | 0.000 | 0 |
| 200-300 | 0.000 | 0 |
| 300+ | 0.225 | 92.6 |
| Total | 0.243 | 100.0 |

EXAMPLE 2

The catalyst prepared according to Example 1 with a surface area of about 10 $m^2/g$ and a pore volume of about 0.25 cc/gm was contacted with Arab Light Vacuum Resid.

The aforementioned resid was reacted over the catalyst under the following conditions:

| | |
| --- | --- |
| Temperature, °F. | 725 |
| LHSV, $hr^{-1}$ | 0.23 to 0.3 |
| Days on Stream (DOS) | 4.3 |

| -continued | |
| --- | --- |
| Hydrogen Consumption, SCF/B | 189 |

The results of this experiment are given below:

| Yields | Approximate Wt. % |
| --- | --- |
| Dry Gas | 0.34 |
| $C_4$ | 0.18 |
| $C_5$+ | 101.1 |

| Properties of Resultant Liquid as Compared to the Feed | | |
| --- | --- | --- |
| | Feed(Resid) | Resultant Liquid |
| Sulfur | 3.90 wt. % | 3.40 wt. % |
| Nitrogen | 0.28 wt. % | 0.29 wt. % |
| CCR | 16.5 wt. % | 12.6 wt. % |
| Nickel | 18 p.p.m. | 13 p.p.m. |
| Vanadium | 68 p.p.m. | 14 p.p.m. |

As can be seen from the above, about 80% vanadium removal and about 28% nickel removal were obtained. Although these removals are less than for the best large pore aluminum resid catalysts (98%), the surface area of this experimental catalyst is relatively small. At a surface area of 100 $m^2/g$, better than 95% demetalation is expected based on these results.

The above results also demonstrate desulfurization capability of this catalyst. Approximately 13% sulfur removal was obtained. The use of a catalyst with a smaller uniform pore size distribution will lead to better desulfurization capabilities than shown herein. Also CCR was reduced by about 24%.

What is claimed is:

1. A process for the catalytical demetalation of a hydrocarbon oil, which comprises contacting said oil with a regenerable catalyst under processing conditions including a temperature between about 600° F. and 850° F. and a space velocity of between about 0.1 and 0.5 LHSV, said regenerable catalyst comprising the oxides or sulfides of a Group VI metal and a Group VIII metal deposited within an amorphous porous glass support of controlled pore size.

2. The process of claim 1 wherein the Group VIII metal of the catalyst is cobalt.

3. The process of claim 1 wherein the Group VIII metal of the catalyst is nickel.

4. The process of claim 2 wherein the Group VI metal of the catalyst is molybdenum.

5. The process of claim 1 wherein the glass support of the catalyst is leached borosilicate glass.

6. The process of claim 4 wherein said metals are present in amounts, based on total catalyst weight, of between about 2 weight percent and 6 weight percent of cobalt oxide and between about 8 weight percent and 20 weight percent of molybdenum trioxide, the remainder being the glass support.

7. The process of claim 6, wherein said support is a glass that upon leaching becomes porous.

8. The process of claim 7 wherein said glass is leached borosilicate glass.

9. The process of claim 8 wherein said borosilicate glass support comprises prior to leaching an alkali metal oxide, $B_2O_3$ and $SiO_2$.

10. The process of claim 9 wherein the alkali metal oxide is sodium oxide.

11. The process of claim 9 wherein the alkali metal oxide is between about 2 and 10 wt.%, the $B_2O_3$ is between about 15 and 35 wt.% and the $SiO_2$ is between about 60 and 85 wt.%.

12. The process of claim 11 wherein the alkali metal oxide is between about 4 and 8 wt.% the $B_2O_3$ is between about 15 and 35 wt.% and the $SiO_2$ is between about 60 and 85 wt.%.

13. The process of claim 1 wherein at least 90% of pore volume of said catalyst has pore diameters of at least 300 Angstroms.

14. The process of claim 1 wherein said oil following said demetalation is subjected to cracking, said cracking being carried out under the following conditions: a temperature of between about 800° F. and 1500° F., a pressure of between about 1 and 5 atmospheres, and a space velocity of between about 1 and 1000 WHSV.

15. The process of claim 1 including the step of hydrocracking said oil following said demetalation, said hydrocracking being carried out under the following conditions: a temperature of between about 400° and 1000° F. and a pressure of between about 100 and 3500 psig.

16. The process of claim 14 wherein said oil is a residual oil.

17. The process of claim 1 including the step of coking said oil following said demetalation, said coking being carried out under the following conditions: a temperature of between about 800° F. and 1100° F. and a pressure of between about 1 and 10 atmospheres.

18. A process of claim 3 wherein the Group VI metal of the catalyst is molybdenum.

19. A process for catalytically demetalating and desulfurizing a hydrocarbon oil, which comprises contacting said oil with a regenerable catalyst under processing conditions including a temperature of between about 600° F. and 850° F., a space velocity of between about 0.1 and 0.5 LHSV, a hydrogen pressure of between about 500 and 3000 p.s.i.g. and a hydrogen circulation rate of between about 1,000 and 15,000 s.c.f./bbl of feed, said regenerable catalyst comprising the oxides or sulfides of a Group VI metal and a Group VIII metal deposited within glass supports of controlled pore size.

20. The process of claim 19 wherein the Group VIII metal of the catalyst is cobalt.

21. The process of claim 19 wherein the Group VIII metal of the catalyst is nickel.

22. The process of claim 20 wherein the Group VI metal of the catalyst is molybdenum.

23. The process of claim 19 wherein the glass support of said catalyst is leached borosilicate glass.

24. The process of claim 22 wherein said metals are present in amounts, based on total catalyst weight, of between about 2 weight percent and 6 weight percent of cobalt oxide and between about 8 weight percent and 18 weight percent of molybdenum trioxide, the remainder being the glass support.

25. The process of claim 24 wherein said support is a glass that upon leaching becomes porous.

26. The process of claim 25 wherein said glass is leached borosilicate glass.

27. The process of claim 26 wherein said borosilicate glass comprises an alkali metal oxide, $B_2O_3$ and $SiO_2$.

28. The process of claim 27 wherein the alkali metal oxide is sodium oxide.

29. The process of claim 27 wherein the alkali metal oxide is between about 2 and 10 wt.%, the $B_2O_3$ is between about 15 and 35 wt.% and the $SiO_2$ is between about 60 and 85 wt.%.

30. The process of claim 29 wherein the alkali metal oxide is between about 4 and 8 wt.%, the $B_2O_3$ is between about 15 and 35 wt.% and the $SiO_2$ is between about 60 and 85 wt.%.

31. The process of claim 19 wherein said oil following said demetalation and desulfurization is subjected to hydrocracking, said hydrocracking being carried out under the following conditions: a temperature of between about 400° and 1000° F. and a pressure of between about 100 and 3500 psig.

32. The process of claim 19 wherein said oil is a residual oil, said residual oil being subjected to cracking following said demetalation and desulfurization, said cracking being conducted at the following conditions: a temperature of between about 800° F. and 1500° F., and a pressure of between about 1 and 5 atmospheres.

33. The process of claim 19 wherein said oil is subjected to coking following said demetalation and desulfurization, said coking being carried out under the following conditions: a temperature of between about 800° F. and 1100° F. and a pressure of between about 1 and 10 atmospheres.

34. The process of claim 19 wherein said regenerable catalyst is disposed into a series of catalyst beds with each bed containing catalyst of a different controlled pore size distribution.

35. The process of claim 34 wherein a two bed catalyst system is utilized with the first bed containing catalyst particles with a majority of its pore volume in diameters of about 300 Angstroms and greater and with the second bed containing catalyst particles with a majority of its pore volume in diameters within the range of between about 50 Angstroms and 200 Angstroms.

36. The process of claim 19 wherein said regenerable catalyst is contained in a guard chamber upstream of a cracking unit.

37. The process of claim 19 wherein said regenerable catalyst is contained in a guard chamber upstream of a hydrocracking unit.

38. The process of claim 19 wherein said regenerable catalyst is contained in a guard chamber upstream of a coking unit.

39. A process of claim 21 wherein the Group VI metal of the catalyst is molybdenum.

* * * * *